United States Patent
Schiffmann et al.

(10) Patent No.: US 10,816,344 B2
(45) Date of Patent: Oct. 27, 2020

(54) METHOD AND SYSTEM FOR DETERMINING THE POINTING ANGLE OF A MOVING OBJECT

(71) Applicant: Delphi Technologies, LLC, Troy, MI (US)

(72) Inventors: Jan K. Schiffmann, Newbury Park, CA (US); Wenbing Dang, North Hollywood, CA (US); Kumar Vishwajeet, Pasadena, CA (US); Keerthi Raj Nagaraja, San Francisco, CA (US); Franz P. Schiffmann, Port Hueneme, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 449 days.

(21) Appl. No.: 15/914,208

(22) Filed: Mar. 7, 2018

(65) Prior Publication Data

US 2019/0277639 A1    Sep. 12, 2019

(51) Int. Cl.

| | |
|---|---|
| *G01C 21/00* | (2006.01) |
| *G01C 21/26* | (2006.01) |
| *G01S 13/58* | (2006.01) |
| *G01S 13/72* | (2006.01) |
| *G01S 13/931* | (2020.01) |
| *G01S 15/66* | (2006.01) |
| *G01S 15/931* | (2020.01) |
| *G01S 17/66* | (2006.01) |
| *G01S 17/931* | (2020.01) |

(52) U.S. Cl.
CPC ............ *G01C 21/26* (2013.01); *G01S 13/589* (2013.01); *G01S 13/723* (2013.01); *G01S 13/931* (2013.01); *G01S 15/66* (2013.01); *G01S 15/931* (2013.01); *G01S 17/66* (2013.01); *G01S 17/931* (2020.01); *G01S 2013/9321* (2013.01); *G01S 2013/9323* (2020.01); *G01S 2013/9324* (2020.01); *G01S 2013/93271* (2020.01)

(58) Field of Classification Search
CPC .... B60W 30/188; B60W 10/02; B60W 10/06; G05D 1/0066
See application file for complete search history.

(56) References Cited

U.S. PATENT DOCUMENTS

2005/0090955 A1* 4/2005 Engelman ............. B60W 10/20
701/36
2009/0157314 A1    6/2009 Jordan et al.

FOREIGN PATENT DOCUMENTS

| DE | 102013018310 A1 | 4/2015 |
|---|---|---|
| EP | 3151034 A1 | 4/2017 |
| EP | 3285230 A1 | 2/2018 |

OTHER PUBLICATIONS

European Search Report for Application No. 19158566.0, European Patent Office, dated Jul. 8, 2019.

* cited by examiner

*Primary Examiner* — Adam M Alharbi
(74) *Attorney, Agent, or Firm* — Carlson, Gaskey & Olds

(57) ABSTRACT

An illustrative example method of tracking a moving object includes determining an initial pointing angle of the object from a tracking device, determining an estimated position of a selected feature on the object based upon the initial pointing angle, determining a velocity vector at the estimated position, determining a lateral acceleration at the estimated position based upon the velocity vector and a yaw rate of the object, determining a sideslip angle of the selected feature based on the lateral acceleration, and determining a refined pointing angle of the object from the determined sideslip angle.

20 Claims, 3 Drawing Sheets

METHOD AND SYSTEM FOR DETERMINING THE POINTING ANGLE OF A MOVING OBJECT

BACKGROUND

Modern day vehicles include a variety of sensors and detectors that provide information regarding the environment or vicinity around a vehicle. For example, radar tracking devices provide information regarding objects in a vicinity or pathway of a vehicle. Such information is useful for driver assistance features. In some cases, automated or semi-automated vehicle operation is possible based on such information. For example, adaptive cruise control and parking assist features are known that automatically control speed or movement of a vehicle based on such sensor input. Autonomous or automated vehicles that are self-driving may utilize such information.

While radar and other sensor devices have proven useful, there are limitations on the type or accuracy of information available from them. For example, known radar tracking devices do not provide information regarding the orientation or pointing angle of an object. Instead, existing radar tracking devices typically operate based on an assumption that the orientation or pointing angle is equal to or aligned with the velocity vector of the centroid of the object. A more accurate indication of the orientation or pointing angle of a moving object would provide better information useful, for example, in determining the potential for a collision with the object.

SUMMARY

An illustrative example method of tracking a moving object includes determining an initial pointing angle of the object from a tracking device, determining an estimated position of a selected feature on the object based upon the initial pointing angle, determining a velocity vector at the estimated position, determining a lateral acceleration at the estimated position based upon the velocity vector and a yaw rate of the object, determining a sideslip angle of the selected feature based on the lateral acceleration, and determining a refined pointing angle of the object from the determined sideslip angle.

An example embodiment having one or more features of the method of the previous paragraph includes determining a difference between the initial pointing angle and the refined pointing angle. When the difference satisfies a selected criterion, the refined pointing angle is used as the pointing angle of the object. When the determined difference does not satisfy the criterion, the initial pointing angle is set to be the same as the refined pointing angle and the steps of determining the estimated position of the selected feature, determining the velocity vector at the estimated position, determining the lateral acceleration at the estimated position, determining the sideslip angle of the selected feature, determining the refined pointing angle of the object and determining the difference between the initial pointing angle and the refined pointing angle are repeated until the difference satisfies the selected criterion.

In an example embodiment having one or more features of the method of either of the previous paragraphs, the selected criterion indicates convergence between the initial pointing angle and the refined pointing angle.

The various features and advantages of at least one disclosed example embodiment will become apparent to those skilled in the art from the following detailed description. The drawings that accompany the detailed description can be briefly described as follows.

DETAILED DESCRIPTION

Figure 1:
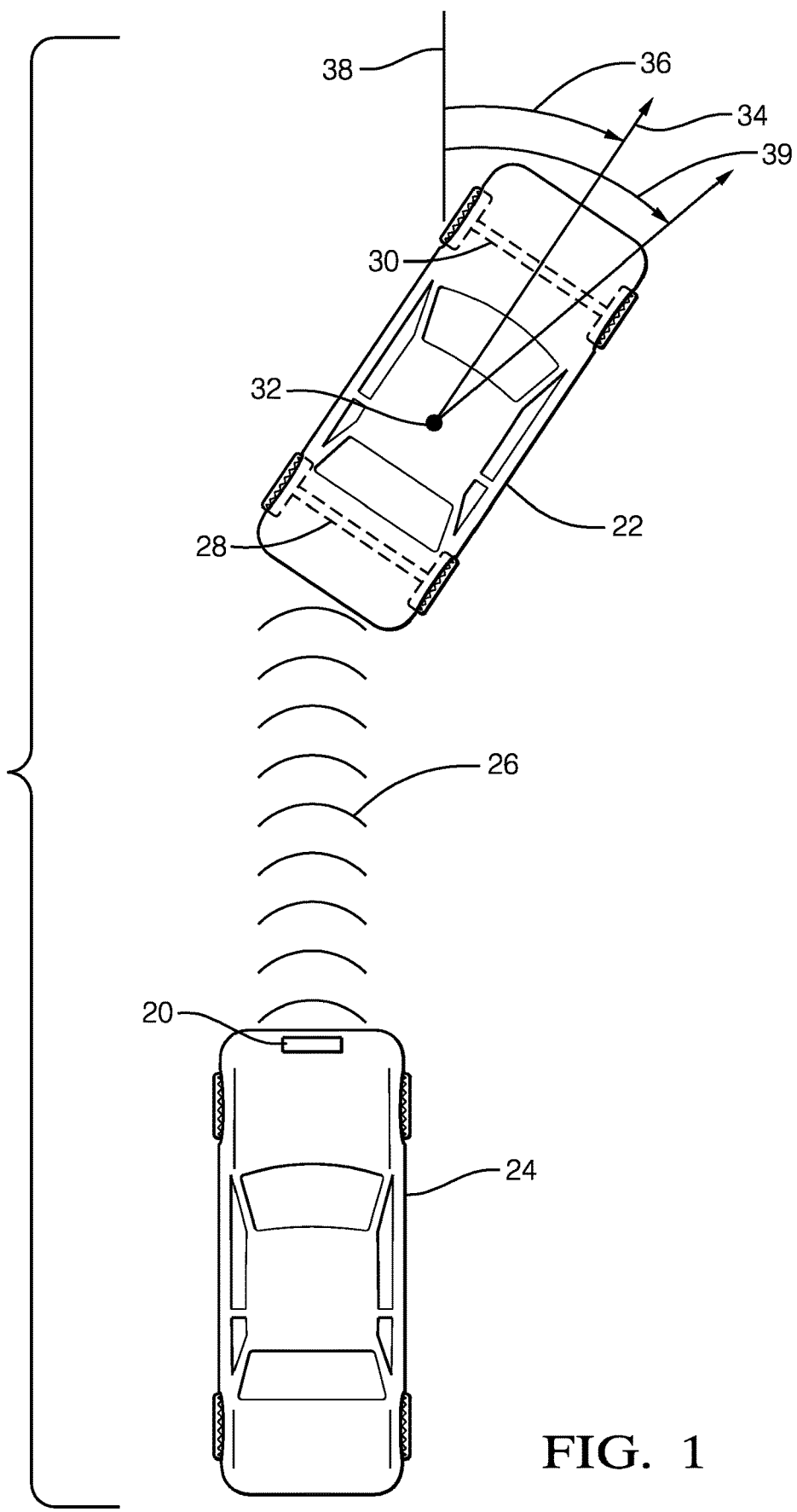
FIG. 1 diagrammatically illustrates an example use of a system for tracking a moving object designed according to an embodiment of this invention.

FIG. 1 diagrammatically illustrates a system 20 for tracking a moving object 22. In this example, the system 20 comprises a tracking device situated on a vehicle 24. For discussion purposes, the moving object 22 is another vehicle located ahead of the vehicle 24 and at least partially in a pathway of the vehicle 24. The system 20 uses radar signaling as schematically shown at 26 for detecting several characteristics of the vehicle 22.

While the moving object or vehicle 22 includes various features, a few are of interest for purposes of understanding an example embodiment of this invention. The vehicle 22 includes a rear wheel axle 28 and a front wheel axle 30. As schematically shown in FIG. 1, the vehicle 22 includes a centroid 32.

The vehicle 22 is traveling along a curved trajectory, such as turning (to the right according to the drawing). Under such conditions, the longitudinal axis 34 is oriented at a pointing angle 36 relative to a reference 38. A velocity vector of the centroid 32 of the vehicle 22 is situated at a heading angle 39 under the conditions shown in FIG. 1. The coordinate system in which the pointing angle 36 is determined may be based upon a world coordinate system in which the reference 38 is one of the axes of that coordinate system. Alternatively, the coordinate system may be fixed relative to the vehicle 24 or the system 20.

In this document, the pointing angle refers to the body orientation angle of a moving object, such as the vehicle 22, that is being tracked by the system 20. The body orientation angle or the pointing angle is the azimuth direction that the moving body's centerline or longitudinal axis is pointing.

In this document, the heading angle is the direction of motion of a particular reference point on the moving object, such as the vehicle 22. It is worth noting that in some contexts, such as aviation, the term "heading angle" is used to refer to that which is called the "pointing angle" in this document. Also, in aviation contexts, the term "track" is used to refer to that which is called the "heading angle" in this document.

Figure 2:
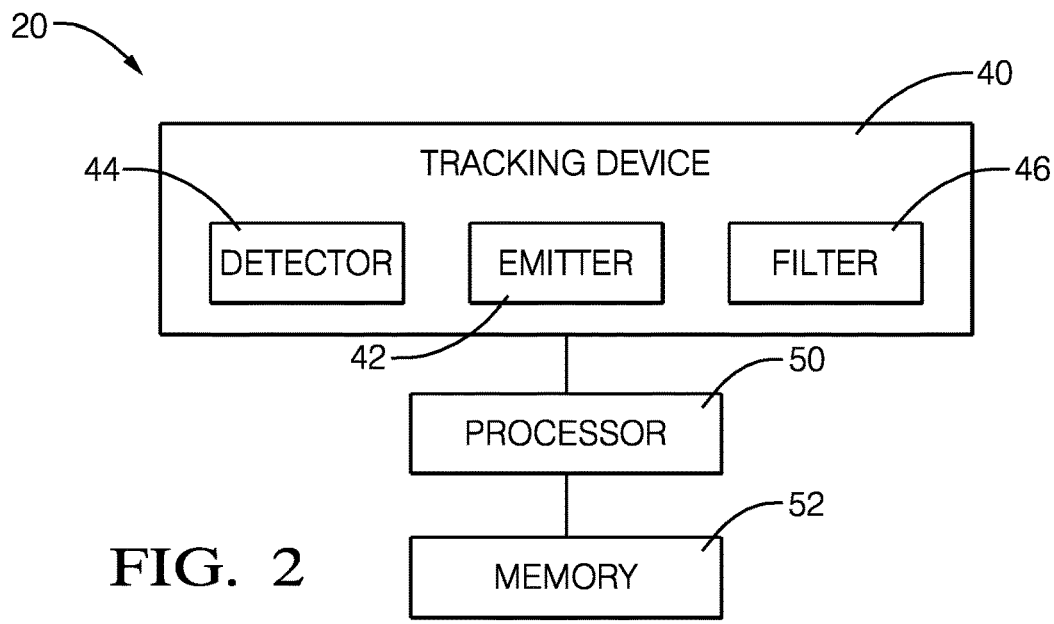
FIG. 2 schematically illustrates selected portions of an example embodiment of a system for tracking an object designed according to an embodiment of this invention.

FIG. 2 schematically illustrates selected portions of the system 20. A tracking device 40 includes an emitter 42 and detector 44. The emitter 42 emits radiation in an outward direction and, when such radiation reflects off of an object, that reflected radiation is received and detected by the detector 44. In some example embodiments, the emitter 42 and detector 44 operate according to known radar principles and techniques. Other embodiments include emitter and detector configurations that are useful for lidar or ultrasonic detection techniques.

The tracking device 40 includes a filter 46 that is configured for estimating dynamic quantities of a tracked object such as the position, velocity, acceleration, and trajectory curvature of that object. In some example embodiments, the filter 46 operates according to known principles of Kalman filters. The filter 46 in this example provides information that indicates the heading angle of a reference point on the moving object. For example, the filter 46 provides information indicating the heading angle 36 of the centroid 32 of the vehicle 22.

The system 20 includes a processor 50, which may be a dedicated microprocessor or a portion of another computing device supported on the vehicle 24. Memory 52 is associated with the processor 50. In some example embodiments, the memory 52 includes computer-executable instructions that cause the processor 50 to operate for purposes of tracking a moving object and determining the pointing angle or body orientation angle of that object. In some example embodiments, the memory 52 at least temporarily contains information regarding various features or characteristics of a tracked object to facilitate the processor 50 making desired determinations regarding the pointing angle of such an object.

The filter 46 is capable of providing information regarding the heading angle of the centroid of a moving object, however, the filter 46 is not capable of directly measuring the pointing angle of a moving object. In this embodiment, the processor 50 is configured for determining the pointing angle based on information from the tracking device 40 regarding the heading angle of a reference point on the object and a vehicle dynamics model. Example embodiments of this invention allow for more accurately determining the pointing angle of a moving object, such as the vehicle 22, which improves object tracking systems and improves the ability to assist a driver or to automate vehicle control based on an improved estimation of the orientation or pointing angle of a tracked object. Embodiments of this invention, therefore, provide an improvement in tracking technology and improvements in vehicle control based on information regarding moving objects in a vicinity or pathway of a vehicle. Having more accurate information regarding a pointing angle of a moving object provides, for example, improved ability to maintain a desired distance or clearance from a moving object.

Figure 3:
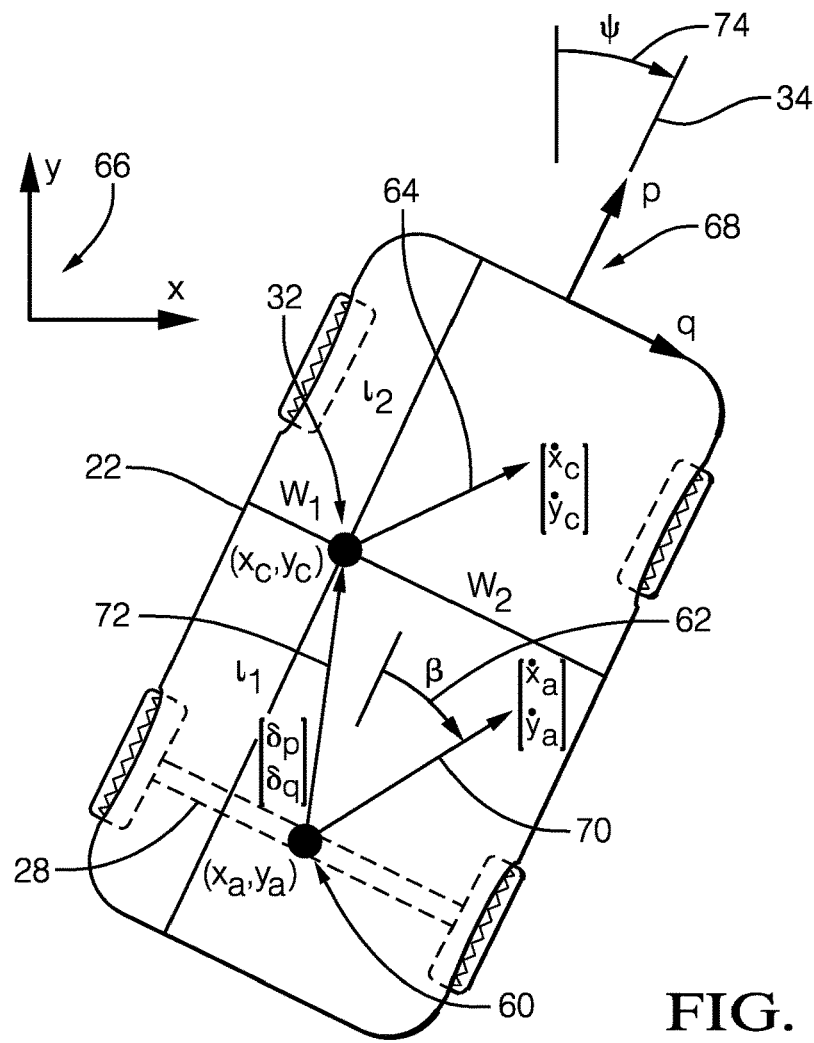
FIG. 3 schematically illustrates various characteristics of a moving object.

FIG. 3 schematically illustrates several features and characteristics of the vehicle 22, which is an example moving object tracked by the system 20. In this example, a vehicle dynamics model can be considered a subset of the known bicycle model, which can be used as a reasonably accurate model of a passenger vehicle operating in a typical manner that includes relatively low lateral acceleration as occurs during most normal passenger vehicle driving. The example vehicle dynamics model includes simplifications, such as neglecting lateral load transfer and suspension compliances. Given that the example vehicle 22 is a four wheeled vehicle assumptions regarding the wheels of the vehicle are made to fit the bicycle model.

A selected feature of the vehicle 22 in this example is the center 60 of the rear wheel axle 28. The illustrated example utilizes the linear relationship between the lateral acceleration of the vehicle 22 and the sideslip angle at the rear axle center 60. The sideslip angle is the angle between the velocity vector at the rear axle center 60 and the vehicle longitudinal axis 34. In FIG. 3, the sideslip angle β is shown at 62. If the velocity vector of the rear axle center 60 is the same as the direction of the rear wheels, then the sideslip angle is 0°. When the vehicle 22 is turning, the velocity vector of the rear axle center 60 is typically not the same as the direction that the rear wheels are pointing. The constant of proportionality between the lateral acceleration and the sideslip angle is called the rear cornering compliance. The rear wheels or tires of the vehicle 22 have a lateral velocity component to generate the lateral forces and consequent yaw moment required to support the lateral acceleration that the vehicle 22 is experiencing, which is expressed by the rear cornering compliance. In a steady-state turn condition that includes a constant yaw rate and constant speed, the yaw moment created by forces at the rear wheels is cancelled by a similar moment generated at the front wheels resulting in a constant yaw rate. In an example embodiment, empirical data is used for determining the value of rear cornering compliance based on measurements of a number of actual vehicles. The kinematics model of the disclosed example embodiment utilizes a linear relationship between the sideslip angle of the rear axle center 60 and lateral acceleration at the rear axle center 60.

In the illustrated example, the tracking filter 46 provides an indication of the velocity vector 64 of the centroid 32 of the vehicle 22. The velocity vector 64 is expressed in terms of an X-Y coordinate system represented at 66. The X-Y coordinate system may be in terms of world coordinates or may be in terms of a coordinate system of the vehicle 24, depending on the particular embodiment. In some cases, the world coordinate system and the coordinate system of the vehicle 24 are the same while in others there is a known relationship between those coordinate systems. Body position coordinates p, q of the vehicle 22 are represented in FIG. 3 at 68.

The tracking device 40 is also capable of providing information regarding a positon of the centroid 32 on the body of the vehicle 22. In FIG. 3, the dimensions $l_1$, $l_2$, $w_1$, and $w_2$ indicate the position of the centroid 32 relative to the edges of the body of the vehicle 22. There are known tracking techniques for determining a bounding box corresponding to the edges of the vehicle 22 and for locating the centroid 32 within that bounding box. In this example, the filter 46 uses a Nearly Coordinated Turn Constant Acceleration Motion Model to provide an estimate of a position of the centroid 32 in the world, an over-the-ground speed of the centroid 32, the heading angle of the centroid 32, which is the same as the direction of the velocity vector 64 shown in FIG. 3. The filter 46 also provides information regarding a trajectory curvature of the centroid 32 and tangential acceleration of the centroid 32.

The speed and curvature of the centroid 32 together imply a yaw rate. In this example embodiment, at a given instant in time the yaw rate is considered to be the same for any two points on the rigid body of the vehicle 22.

The position of the centroid 32 may be determined in advance or located within the bounding box of the vehicle 22 by processing the positions of radar detections of the vehicle relative to the centroid position over time. In either case, determining the pointing angle of the vehicle 22 effectively amounts to determining how the bounding box of the vehicle 22 should be rotated about the centroid 32 in a way that simultaneously satisfies the vehicle dynamics constraint at the rear axle center 60 and the kinematic relationship between the velocity vectors 64 (at the centroid 32) and 70 (at the rear axle center 60).

In the illustrated example, a longitudinal position of the rear axle 28 is assumed relative to the body of the vehicle 22. In some examples, the assumed longitudinal position is approximately one meter ahead of the rear of the vehicle 22. In some examples, the rear axle center 60 is assumed to be at the rear of the vehicle 22. Given the assumed longitudinal position of the rear axle center 60 and the location of the centroid 32, the processor 50 determines a vector 72 from the rear axle center 60 to the centroid 32.

The processor 50 in this embodiment uses an iterative relaxation approach to determine the pointing angle, which is represented by ψ at 74 in FIG. 3, that simultaneously satisfies the vehicle dynamics constraint at the rear axle center 60 and the kinematic relationship between the velocity vectors 64 and 70.

Figure 4:
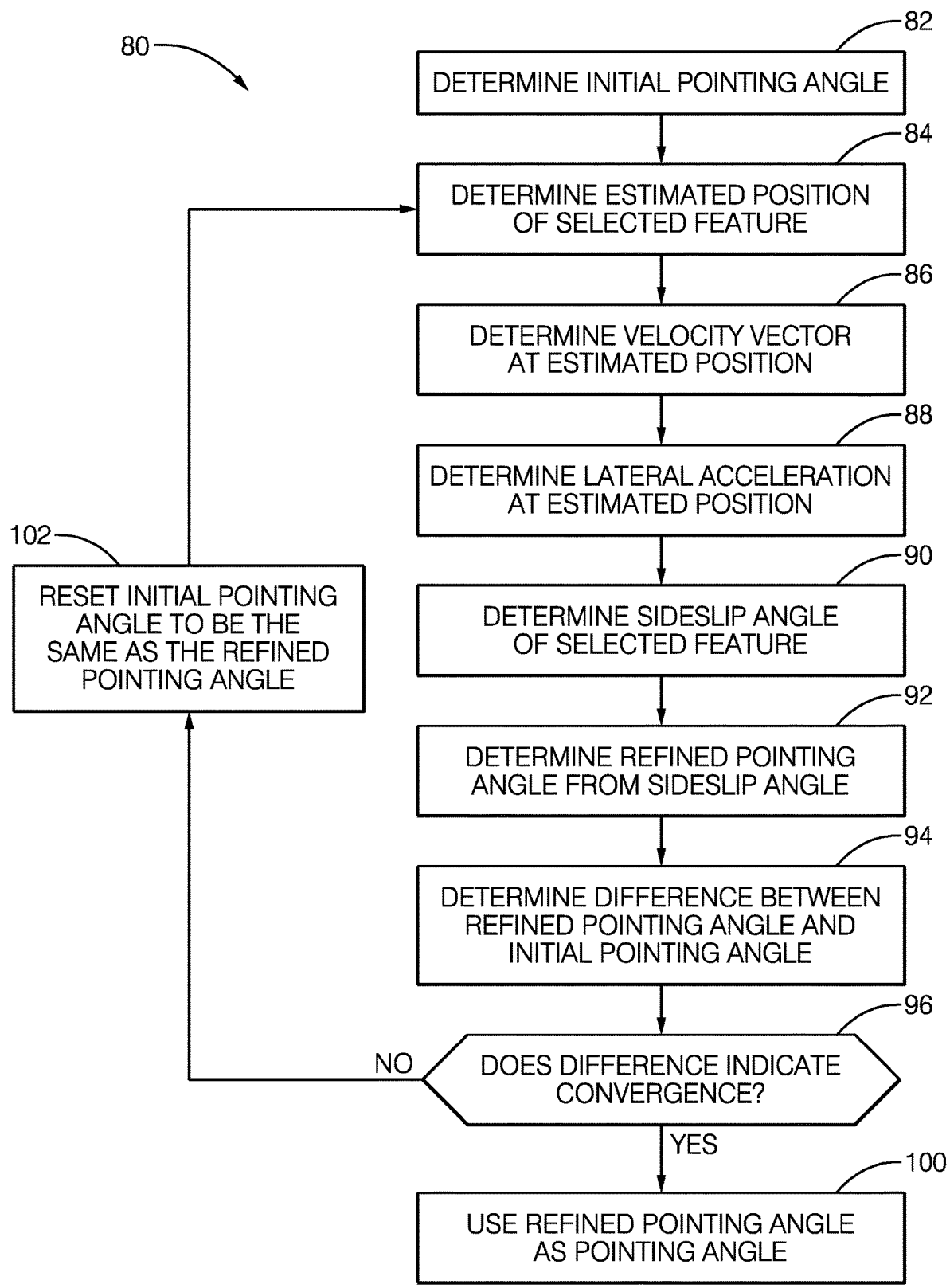
FIG. 4 is a flowchart diagram summarizing an example approach of determining a pointing angle of a moving object while tracking that object.

FIG. 4 includes a flowchart diagram 80 that summarizes an example method of tracking a moving object, such as the vehicle 22 including determining the pointing angle or body orientation angle of the vehicle 22.

At 82, the processor 50 determines an initial pointing angle value. In this example, the initial pointing angle is set equal to the heading angle of the centroid 32, which is the same as the direction of the velocity vector 64. At 84, the processor 50 determines an estimated position of a selected feature on the moving object, which is the rear axle center 60 in this case. The processor 50 determines the estimated position of the rear axle center 60 from the following rotation matrix M and relationship between the x and y coordinates of the rear axle center 60 and centroid 32:

$$M = \begin{bmatrix} \cos\psi & -\sin\psi \\ \sin\psi & \cos\psi \end{bmatrix}$$

$$\begin{bmatrix} x_a \\ y_a \end{bmatrix} = \begin{bmatrix} x_c \\ y_c \end{bmatrix} - M \begin{bmatrix} \delta_p \\ \delta_q \end{bmatrix}$$

wherein $$\begin{bmatrix} \delta_p \\ \delta_q \end{bmatrix}$$

is the vector 72 from the rear axle center 60 to the centroid 32 expressed in the body coordinates p, q shown at 68 in FIG. 3.

While it is possible to determine the position of the rear axle center 60 relative to the centroid 32 in body coordinates p, q, some example embodiments include assuming that the rear axle center 60 is located at the lateral center of the rear face of the vehicle 22. Given that assumption, $\delta_p = l_1$, and $$\delta_q = \frac{w_1 - w_2}{2}$$

At 86, the processor 50 determines a velocity vector at the estimated position of the rear axle center 60. The processor 50 uses the kinematic relationships of the vehicle dynamics model and the yaw rate ω according to the following relationship:

$$\begin{bmatrix} \dot{x}_a \\ \dot{y}_a \end{bmatrix} = \begin{bmatrix} \dot{x}_c \\ \dot{y}_c \end{bmatrix} - \begin{bmatrix} -(y_c - y_a) \\ x_c - x_a \end{bmatrix} \omega$$

At 88, the processor 50 uses the velocity vector 70 of the rear axle center 60 and the yaw rate ω to determine a lateral acceleration at the rear axle center 60 using the following relationship:

$$a_y = \omega[\dot{x}_a^2 + \dot{y}_a^2]^{1/2}$$

Based on the lateral acceleration, the processor 50 determines the rear axle sideslip angle β shown at 62 in FIG. 3 using the following relationship:

$$\beta = \gamma a_y$$

wherein γ is a calibration value representing the rear cornering compliance of the tracked vehicle 22.

At 92, the processor 50 uses the rear axle sideslip angle to determine a refined pointing angle using the following relationship:

$$\psi = a\tan 2(\dot{y}_a, \dot{x}_a) - \beta$$

At 94, the processor 50 determines a difference between the refined pointing angle determined at 92 and the initial pointing angle determined at 82. The processor 50 determines whether the difference between the initial pointing angle and the refined pointing angle indicate convergence at 96. When the difference between those angles satisfies a selected criterion, such as an acceptable range of difference, sufficient convergence exists for the refined pointing angle to be considered the body orientation angle or pointing angle ψ of the vehicle 22, which is shown at 74 in FIG. 3. In FIG. 4, the processor 50 uses the refined pointing angle as the determined pointing angle of the vehicle 22 at 100.

The example approach is iterative and includes repeating the steps shown at 84-94 in FIG. 4 when the values of the refined pointing angle and the initial pointing angle have not yet converged. If the difference determined at 96 does not indicate sufficient convergence (e.g., the difference does not satisfy the selected criterion), then the processor 50 resets the initial pointing angle to be the same as the refined pointing angle at 102. This reset value of the initial pointing angle is then utilized by the processor 50 through steps 84-94 to determine a new refined pointing angle and again at 96 whether sufficient convergence exists. The processor 50 repeats those steps in an iterative fashion until there is sufficient convergence for determining the pointing angle and setting the pointing angle to be the refined pointing angle at 100.

The disclosed example embodiment approach for determining the pointing angle of a moving object, such as the vehicle 22, improves object tracking and automated or semi-automated vehicle control in an efficient manner that does not require using the quadratic formula and multiple solutions, which would be computationally complex. Example embodiments of this invention provide reasonably accurate information regarding a body orientation angle or pointing angle of a moving object that is more accurate than previous approaches, which at best assumed the pointing angle to be the same as the heading angle of a centroid of such an object.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of tracking a moving object, the method comprising:
   determining an initial pointing angle of the object from a tracking device;
   determining an estimated position of a selected feature on the object based upon the initial pointing angle;
   determining a velocity vector at the estimated position;

determining a lateral acceleration at the estimated position based upon the velocity vector and a yaw rate of the object;

determining a sideslip angle of the selected feature based on the lateral acceleration; and determining a refined pointing angle of the object from the determined sideslip angle.

2. The method of claim 1, comprising determining a difference between the initial pointing angle and the refined pointing angle; and (i) when the difference satisfies a selected criterion, using the refined pointing angle as the pointing angle of the object; or (ii) when the determined difference does not satisfy the selected criterion, setting the initial pointing angle to be the same as the refined pointing angle; and repeating the steps of determining the estimated position of the selected feature on the object, determining the velocity vector at the estimated position, determining the lateral acceleration at the estimated position, determining the sideslip angle of the selected feature, determining the refined pointing angle of the object, and determining the difference between the initial pointing angle and the refined pointing angle until the difference satisfies the selected criterion.

3. The method of claim 2, wherein the selected criterion indicates convergence between the initial pointing angle and the refined pointing angle.

4. The method of claim 1, wherein the object is a vehicle having a front wheel axle and a rear wheel axle; and the selected feature is a center of the rear wheel axle.

5. The method of claim 4, wherein the pointing angle indicates a direction along which the vehicle is traveling.

6. The method of claim 1, wherein determining the initial pointing angle of the object from the tracking device comprises determining a heading angle of a centroid of the object from the tracking device; and setting the initial pointing angle to be the same as the heading angle.

7. The method of claim 6, wherein determining the estimated position of the selected feature on the object based upon the initial pointing angle comprises determining a vector describing a relationship between a position of the centroid and the selected feature in terms of a coordinate system that is fixed relative to the object;

rotating the vector by a rotation matrix that is based on the initial pointing angle; and determining the estimated position from a difference between the position of the centroid and the rotated vector.

8. The method of claim 7, wherein determining the velocity vector at the estimated position comprises determining a kinematic relationship between centroid and the selected feature; and using the yaw rate and the kinematic relationship to determine the velocity vector.

9. The method of claim 8, wherein the velocity vector comprises an x component and a y component; and determining the refined pointing angle of the object, comprises subtracting the determined sideslip angle from a tan 2 of the y and x components.

10. The method of claim 6, wherein determining the estimated position of the selected feature on the object based upon the initial pointing angle comprises assuming that the selected feature is located at a center of a rear face of the object.

11. A system for tracking a moving object, the system comprising:

a tracking device configured to detect the moving object; and a processor configured to:

determine an initial pointing angle of the object based on information from the tracking device;

determine an estimated position of a selected feature on the object based upon the initial pointing angle;

determine a velocity vector at the estimated position;

determine a lateral acceleration at the estimated position based upon the velocity vector and a yaw rate of the object;

determine a sideslip angle of the selected feature based on the lateral acceleration; and determine a refined pointing angle of the object from the determined sideslip angle.

12. The system of claim 11, wherein the processor is configured to:

determine a difference between the initial pointing angle and the refined pointing angle; and (i) when the difference satisfies a selected criterion, use the refined pointing angle as the pointing angle of the object; or (ii) when the determined difference does not satisfy the selected criterion, set the initial pointing angle to be the same as the refined pointing angle; and repeatedly determine the estimated position of the selected feature on the object, determine the velocity vector at the estimated position, determine the lateral acceleration at the estimated position, determine the sideslip angle of the selected feature, determine the refined pointing angle of the object, and determine the difference between the initial pointing angle and the refined pointing angle until the difference satisfies the selected criterion.

13. The system of claim 12, wherein the selected criterion indicates convergence between the initial pointing angle and the refined pointing angle.

14. The system of claim 11, wherein the object is a vehicle having a front wheel axle and a rear wheel axle; and the selected feature is a center of the rear wheel axle.

15. The system of claim 14, wherein the pointing angle indicates a direction along which the vehicle is traveling.

16. The system of claim 11, wherein the processor is configured to determine the initial pointing angle of the object by determining a heading angle of a centroid of the object based on the information from the tracking device; and setting the initial pointing angle to be the same as the heading angle.

17. The system of claim 16, wherein the processor is configured to determine the estimated position of the selected feature on the object based upon the initial pointing angle by
- determining a vector describing a relationship between a position of the centroid and the selected feature in terms of a coordinate system that is fixed relative to the object;
- rotating the vector by a rotation matrix that is based on the initial pointing angle; and
- determining the estimated position from a difference between the position of the centroid and the rotated vector.

18. The system of claim 17, wherein the processor is configured to determine the velocity vector at the estimated position by
- determining a kinematic relationship between centroid and the selected feature; and
- using the yaw rate and the kinematic relationship to determine the velocity vector.

19. The system of claim 18, wherein
- the velocity vector comprises an x component and a y component; and
- the processor is configured to determine the refined pointing angle of the object by subtracting the determined sideslip angle from a tan 2 of the y and x components.

20. The system of claim 16, wherein the processor is configured to determine the estimated position of the selected feature on the object by assuming that the selected feature is located at a center of a rear face of the object.

* * * * *